Jan. 26, 1965 E. T. HUMBY 3,167,316

PHONOGRAPHS

Filed Feb. 23, 1962 2 Sheets-Sheet 1

Inventor
E. T. Humby
By
Holcombe Wetherill & Brisebois
Attorneys

Inventor
E. T. Humby
By Holcombe, Wetherill & Brisebois
Attorneys

United States Patent Office 3,167,316
Patented Jan. 26, 1965

1 2

3,167,316
PHONOGRAPHS
Edward Thomas Humby, Emarson Park, Hornchurch, Essex, England, assignor to The Magnavox Electronics Company Limited
Filed Feb. 23, 1962, Ser. No. 175,142
Claims priority, application Great Britain Mar. 1, 1961
4 Claims. (Cl. 274—10)

This invention relates to magazine spindles for automatic record changing gramophones. One well known kind of magazine spindle comprises two cylindrical portions arranged one above the other. The upper portion is laterally offset from the lower so that a horizontal step is formed at the top of the lower. A stack of records to be played on the gramophone are placed over the upper portion of the spindle and the lowermost record in the stack rests on the step. To enable the lowermost record in the stack to be played it is pushed sideways so that its central hole coincides with the lower portion of the spindle and it then falls down the spindle on to the turntable below. The lowermost record can be moved sideways so that it is disengaged from the step by either one of two mechanisms. One mechanism has a lever which is pivotally mounted in a vertical slot in the lower portion of the spindle and the upper end of which engages in the hole in the lowermost record. With this mechanism, when the lowermost record is to be dropped, the lever is rocked by a driving mechanism in the gramophone and this pushes the record sideways. In the second mechanism a pusher engages with the edge of the record and pushes it sideways off the step in the same way as the lever already described.

When all the records previously supported in the stack on the magazine spindle have been dropped on to the gramophone turntable and played, it is desirable to be able to lift the whole stack of records together and withdraw them upwardly from the top of the spindle. To enable this to be done without the records becoming caught up on the offset part of the bottom end of the upper portion of the spindle a transition section must be provided in the spindle between the step and the bottom of the upper cylindrical portion. This transition section has a tapering surface between the step and the bottom of the upper cylindrical portion to enable the records to ride smoothly over the offset part of the bottom of the upper cylindrical portion. When this transition is provided, however, the record immediately above the lowermost record in the stack is not positively located in a lateral direction and it is possible when the lowermost record is pushed sideways to move it off the step that the next record also might be moved by the frictional drag of the lowermost record upon it so that it is also moved off the step and drops. Means must, therefore, be provided on the upper cylindrical portion of the spindle to prevent this happening, but this means must not obstruct removal of the stack of records from the spindle.

According to the present invention a magazine spindle of the kind described has a surrounding sleeve mounted on its upper cylindrical portion so that it can slide vertically between two positions, in the lower of which the sleeve projects downwards towards the step over the transition section and in use, by engagement in the central holes in the records, prevents all the records except the lowermost in a stack on the step from being moved laterally, and in the upper of which the sleeve is entirely above the transition section and allows a stack of records to be withdrawn from the spindle all together upwards over the transition section and the upper cylindrical portion.

The upper cylindrical portion of the spindle is preferably annularly recessed around its periphery and the sleeve is mounted in this recess so that its outside surface is flush with the remaining part of the outside surface of the upper cylindrical portion. When the sleeve is mounted in this way, the stack of records will ride smoothly over it as the stack is withdrawn from the spindle and there is no chance of the records fouling any part of the lower edge of the sleeve.

The bottom edge of the annular recess preferable slopes downwards at an acute angle in a direction away from the side of the upper cylindrical portion adjacent the step. The sleeve has a correspondingly sloping lower edge which seats on the edge of the recess when the sleeve is in its lower position. It is the bottom part of the sleeve at the end of the sloping edge which engages in the central holes of the records above the lowermost record in the stack. To guide the sleeve in its sliding movement on the upper cylindrical portion of the spindle and to prevent the sleeve rotating, the sleeve may have a longitudinal slot formed in it and the recessed portion of the upper cylindrical part of the spindle may have a projecting nib which engages in the slot in the sleeve.

An example of a gramophone having a magazine spindle constructed in accordance with the invention is illustrated in the accompanying drawings, in which.

Figure 1:
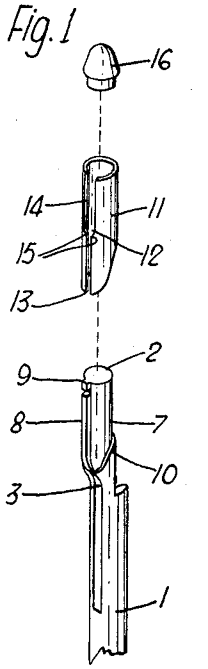
FIGURE 1 is an exploded perspective view of the upper end of the spindle and of the sleeve, as seen in one direction.
Figure 2:
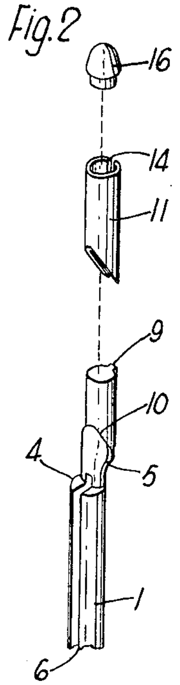
FIGURE 2 is a similar perspective view, as seen in an opposite direction.

The spindle has a lower cylindrical portion 1, an upper cylindrical portion 2 and a transition section 3 between these two portions. At the top of the portion 1 is a step 4 and at the bottom of the portion 2 is a sloping surface 5 which forms one side of the transition section 3. The lower portion 1 is formed with a longitudinal slot 6 in which a push-off lever, not shown, is pivotally mounted.

The upper cylindrical portion 2 is formed with an annular recess 7, on one side of which a vertical nib 8 projects. At the top end of the nib 8 is a projection 9. The bottom edge 10 of the recess 7 slopes downwards from the face of the portion 2 adjacent the step 4 towards the sloping surface 5 at the bottom of the portion 2. A sleeve 11 is carried in the recess 7 so that it can slide vertically upwards and downwards. The sleeve 11 has a longitudinal slot 12, the lower portion 13 of which is a sliding fit on the nib 8. After the sleeve 11 has been assembled on the recess 7, the projection 9 is enlarged to locate the sleeve 11 in position. There are shoulders 15 on each side of the slot 12 at the junction between the portions 13 and 14 and these shoulders engage with the underside of the projection 9 when the sleeve 11 is in its upper position, as shown in FIGURE 4, and prevent the sleeve being completely withdrawn from the spindle. The upper end of the sleeve 11 is closed by a plastic cap 16. When the sleeve 11 is in its lower position, as shown in FIGURE 3 of the drawings, its bottom end engages in the central holes in the records 17 above the lowermost record 18 in the stack 19.

Figure 3:
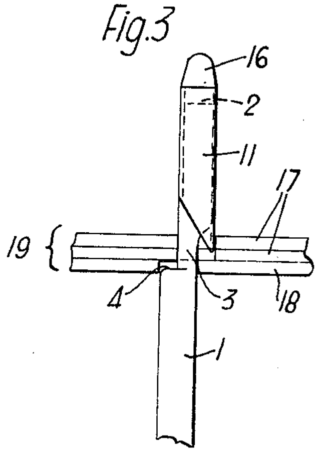
FIGURE 3 is a side elevation of the upper end of the spindle showing a stack of records in position on its step and with the sleeve in its lower position.
Figure 4:
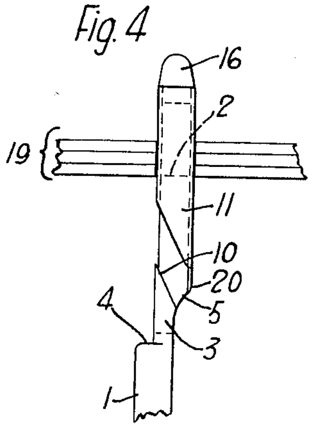
FIGURE 4 is a side elevation similar to FIGURE 3, but showing the sleeve in its upper position and the stack of records being withdrawn from the spindle.

As shown in FIGURE 3, the lowermost record 18 can be moved laterally by the push-off lever in the slot 6 so that its hole coincides with the lower portion 1 of the spindle and so that the record can then slide down the spindle on to the turntable below.

When all the records in the stack 19 have been played, the stack can be lifted into the position shown in FIGURE 4 of the drawings. In reaching this position, the records come into contact with the bottom edge of the sleeve 11 and lift the sleeve from its lower position, shown in FIGURE 3 into its upper position, shown in FIGURE 4. As the uppermost record in the stack 19 comes into engagement with the bottom of the nib 8 which, as shown at 20 in FIGURE 4 is smoothly chamfered, the records ride over the sleeve 11 and can be withdrawn from the upper end of the spindle.

Figure 6:
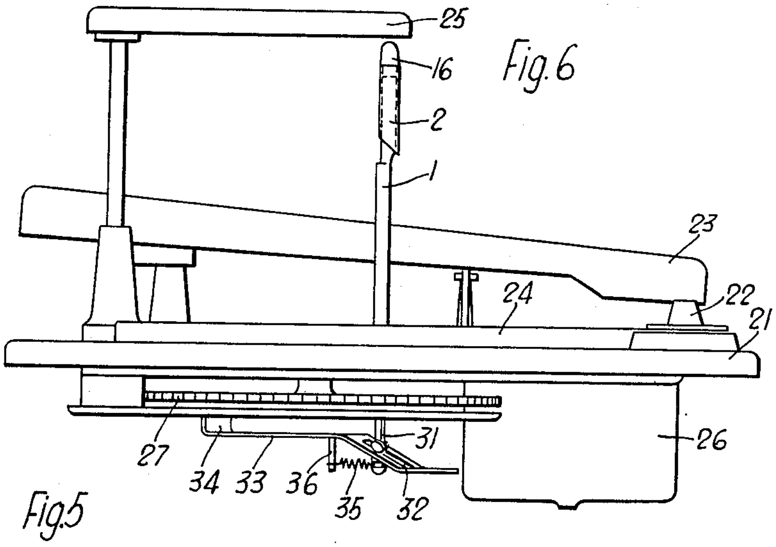
FIGURE 6 is a side elevation of the gramophone.
Figure 5:
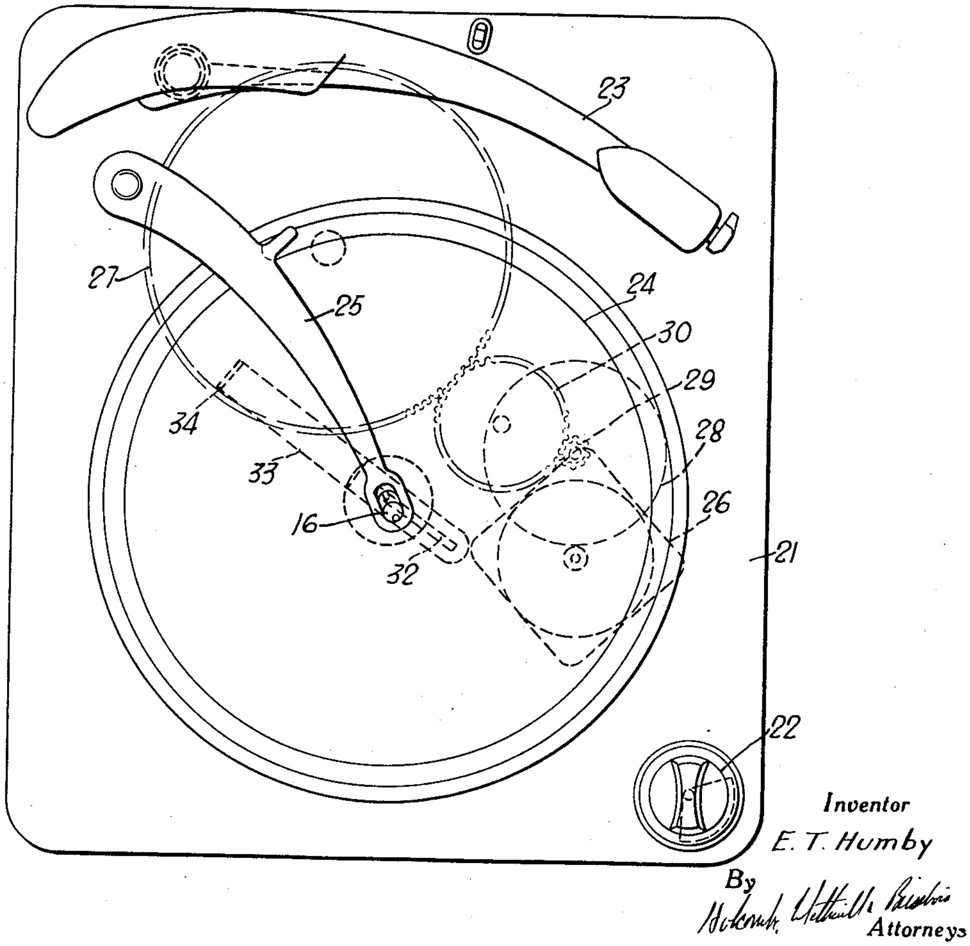
FIGURE 5 is a plan of the gramophone.

The lower cylindrical portion 1 is fixed to a spring loaded platform 21 of the automatic gramophone illustrated in FIGURES 5 and 6. The gramophone comprises a combined on-off switch and control knob 22, a pick up arm 23, a turntable 24 and a stabilising arm 25 for maintaining the records horizontally on the spindle.

The automatic record change cycle of the gramophone is controlled by an electric motor 26 which is switched on and off in dependence on the radial position of the end of pick up arm 23 over the turntable. The motor 26 drives a plate 27 having a cam surface formed on it through a rubber drive wheel 28 which is fixed to the spindle of a gear wheel 29 which in turn meshes with another gear wheel 30. The push off lever is caused to pivot by the vertical movement of a push rod 31 the lower end of which is captive in a slot 32 in an inclined part of a cam lever 33. The lever 33 is moved backwards and forwards longitudinally as the plate 27 rotates because an upturned end 34 of the lever 33 engages the cam surface of the plate 27. This movement of the lever towards the rod 31 causes the rod 31 to be raised so that it forces the push off lever to pivot and push the lowermost record on the step of the spindle laterally whereupon the record falls onto the turntable 24. Further rotation of the plate 27 causes the lever 33 to move away from the rod 31 in preparation for another change cycle. The tip of the rod 31 is connected by a spring 35 to a projection 26 on the rod 31 so that the rod 31 is always urged to its raised position.

I claim:

1. In an automatic record-changing phonograph having a mechanism which brings about a record change cycle the improvement which comprises a magazine spindle having a lower cylindrical portion, an upper cylindrical portion laterally offset above said lower cylindrical portion, a horizontal step formed on top of said lower cylindrical portion, a transition section between said step and the bottom of said upper cylindrical portion, a tapering surface on said transition section whereby, in use, records may be caused to ride smoothly between said lower and upper cylindrical portions, and a sleeve embracing said upper cylindrical portion, said sleeve being slidable axially along said cylindrical portion between two positions, in the lower of which positions said sleeve projects downwards towards said step over said transition section and, by engagement in their central holes, prevents all except the lowermost in a stack of records on said step from being moved laterally, and in the upper of which said sleeve is entirely above said transition section and allows a stack of records to be simultaneously withdrawn from the spindle over said transition section and said upper cylindrical portion.

2. A phonograph according to claim 1, in which said upper cylindrical portion is annularly recessed around its periphery and said sleeve is mounted in this recess so that its outside surface is flush with the remaining part of the outside surface of said upper cylindrical portion.

3. A phonograph according to claim 2, in which the bottom edge of said annular recess slopes downwards at an acute angle in a direction away from the side of said upper cylindrical portion adjacent said step and said sleeve has a correspondingly sloping lower edge which seats on said edge of said recess when said sleeve is in its lower position.

4. A phonograph according to claim 2, in which said sleeve has a longitudinal slot formed in it and said annular recess of said upper clyindrical portion has a projecting nib which engages in said slot so that said sleeve is prevented from rotating.

References Cited by the Examiner

UNITED STATES PATENTS

| | | | |
|---|---|---|---|
| 2,514,949 | 7/50 | Guedon | 274—10 |
| 2,545,847 | 3/51 | Guedon | 274—10 |
| 2,634,983 | 4/53 | Dale | 274—10 |
| 3,000,637 | 9/61 | Guest | 274—10 |

LOUIS J. CAPOZI, *Primary Examiner.*

ALDRICH F. MEDBERY, *Examiner.*